(12) United States Patent
Hübler

(10) Patent No.: US 9,741,492 B2
(45) Date of Patent: *Aug. 22, 2017

(54) ENERGY STORAGE IN QUANTUM RESONATORS

(71) Applicant: The Board of Trustees of the University of Illinois, Urbana, IL (US)

(72) Inventor: Alfred W. Hübler, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 108 days.

This patent is subject to a terminal disclaimer.

(21) Appl. No.: 14/943,439

(22) Filed: Nov. 17, 2015

(65) Prior Publication Data

US 2017/0069426 A1    Mar. 9, 2017

Related U.S. Application Data

(63) Continuation-in-part of application No. 14/186,118, filed on Feb. 21, 2014, now Pat. No. 9,218,906, which
(Continued)

(51) Int. Cl.
*H01G 4/38* (2006.01)
*H01G 4/10* (2006.01)
(Continued)

(52) U.S. Cl.
CPC ........... *H01G 4/10* (2013.01); *H01G 4/06* (2013.01); *H01G 4/38* (2013.01); *H01G 4/12* (2013.01)

(58) Field of Classification Search
None
See application file for complete search history.

(56) References Cited

U.S. PATENT DOCUMENTS

| 2,524,000 A | 12/1945 | Spencer | 175/41 |
| 7,667,996 B2 | 2/2010 | Shepard | 365/118 |

(Continued)

OTHER PUBLICATIONS

Eden et al., "Microplasma devices fabricated in silicon, ceramic, and metal/polymer structures: arrays, emitters and photodetectors," *J. Phys. D. Appl. Phys.*, vol. 36, No. 23, pp. 2869-2877 (Dec. 2003).
(Continued)

*Primary Examiner* — Dion R Ferguson
(74) *Attorney, Agent, or Firm* — Sunstein Kann Murphy & Timbers LLP

(57) ABSTRACT

Methods and apparatus for storing information or energy. An array of nano-capacitors is provided, where each nano-capacitor has a plurality of cathodic regions and an anode separated from each of the cathodic regions by one or more intervening dielectrics. Each nano-capacitor acts as a quantum resonator thereby suppressing electron emission. The thickness of the intervening dielectric is in the range between 0.1 nanometers and 1000 nanometers and is shorter than an electron mean free path within the dielectric. Each cathodic region is at least 100 times larger than the thickness of the intervening dielectric in every direction transverse to the thickness of the intervening dielectric. An excess of electrons is stored on the cathodic regions. The dielectric may be a metal oxide, particularly a native oxide of the cathode material.

16 Claims, 6 Drawing Sheets

Related U.S. Application Data is a continuation-in-part of application No. 12/908,107, filed on Oct. 20, 2010, now Pat. No. 8,699,206.

(60) Provisional application No. 61/774,133, filed on Mar. 7, 2013, provisional application No. 62/083,775, filed on Nov. 24, 2014.

(51) Int. Cl.
  *H01G 4/06* (2006.01)
  *H01G 4/12* (2006.01)

(56) References Cited

U.S. PATENT DOCUMENTS

| | | | | |
|---|---|---|---|---|
| 9,218,906 | B1* | 12/2015 | Hubler | H01G 4/06 |
| 2010/0002362 | A1* | 1/2010 | Clelland | H01G 11/12 361/502 |
| 2010/0330435 | A1* | 12/2010 | Nemeth | H01M 8/184 429/402 |

OTHER PUBLICATIONS

Ekanayake et al., "Design of deep-nanometer-scale capacitors and associated materials challenges," *Curr. Appl. Phys.*, vol. 4, 4 pages (2004).

Fowler et al., "Electron Emission in Intense Electric Fields," *Roy. Soc. Proc. A*, vol. 119, pp. 173-181 (1928).

Hübler, "Digital Batteries," *Complexity*, vol. 14, No. 3, pp. 7-8 (Dec. 2008).

Hübler et al., "Digital quantum batteries: Energy and information storage in nano vacuum tube arrays," *Dept. of Physics, University of Illinois at Urbana-Champaign*, Sep. 22, 2009, 17 pages.

Hubler, "Synthetic Atoms: Large Energy Density and a Record Power Density," vol. 18, No. 4, pp. 12-14 (2013).

Hwang et al., "Fabrication of vacuum tube arrays with a sub-micron dimension using anodic aluminum oxide nano-templates," *Microelectron. Eng.*, vol. 77, No. 1, pp. 2-7 (Jan. 2005).

Katayama et al., "Design and Analysis of High-Speed Random Access Memory with Coulomb Blockade Charge Confinement," *IEEE Trans. Electr. Dev.*, vol. 46, pp. 2210-2216 (1999).

Kolodzey et al., "Electrical Conduction and Dielectric Breakdown in Aluminum Oxide Insulators on Silicon," *IEEE T. Electron Dev.*, vol. 47, No. 1, pp. 121-128 (Jan. 2000).

Raichev, "Coulomb blockade of field emission from nanoscale conductors," *J. Phys. B*, vol. 73, 9 pages (2006).

Schindall, "The Charge of the Ultracapacitors—Nanotechnology takes energy storage beyond batteries," *IEEE Spectrum*, vol. 44, pp. 42-46 (Nov. 2007).

Sohn et al., "Fabrication of high-density arrays of individually isolated nanocapacitors using anodic aluminum oxide templates and carbon nanotubes," *Appl. Phys. Lett*, vol. 87, pp. 123115-1-123115-3 (2005).

* cited by examiner

ENERGY STORAGE IN QUANTUM RESONATORS

The present application is a continuation-in-part of U.S. Ser. No. 14/186,118, issued as U.S. Pat. No. 9,218,906, which is a continuation-in-part of U.S. Ser. No. 12/908,107, issued as U.S. Pat. No. 8,699,206, and also claims the benefit of U.S. Provisional Application No. 61/774,133 filed Mar. 7, 2013. The present application, additionally, claims the benefit of U.S. Provisional Application No. 62/083,775, filed Nov. 24, 2014.

This invention was made with government support under Grant DMS 03-25939 ITR, awarded by the National Science Foundation under Contract No. 1-485927-244014-191100, awarded by the U.S. Air Force, under Grant N00014-14-1-0381 awarded by the Office of Naval Research, and under Grant No. FA9453-14-1-0247, awarded by the Air Force Research Laboratory. The Government has certain rights in the invention.

TECHNICAL FIELD

The present invention relates to devices and methods for high-density storage of energy in materials configured as nano-capacitors subject to specified material and geometrical properties.

BACKGROUND ART

In supercapacitors and ultracapacitors, surveyed, for example in Schindall, *The Charge of the Ultracapacitors*, IEEE Spectrum, vol. 44, pp. 42-46 (2007), nanomaterials have been used to increase charge density.

Insofar as the volumetric energy density of energy stored in a capacitor is $U_d = \epsilon_0 \in E^2$, where $\epsilon_0$ is the vacuum permittivity, $\in$ is the dielectric constant characterizing the dielectric, and E is the electric field in the dielectric, stored energy is optimized by maximizing E. For a parallel plate geometry, the electric field is the applied voltage V divided by the capacitor spacing d, so stored energy density scales as $(V/d)^2$, and correspondingly for other geometries.

Tunneling processes, such as Fowler-Nordheim field emission (the phenomenology of which was laid out in their seminal "*Electron Emission in Intense Electric Fields,*" *Roy. Soc. Proc. A*, vol. 119, pp. 173-81 (1928), incorporated herein by reference, have long been known to limit charge confinement on an electrode, in that a finite probability of emission will ultimately cause an electron to surmount a potential barrier and charge will be lost to leakage current. The Coulomb blockade effect, in which the quantization of energy of a particle in a potential well serves to impede tunneling out of the potential well (see Raichev, "*Coulomb blockade of field emission from nanoscale conductors,*" *J. Phys. B*, vol. 73, 195328 (2006), incorporated herein by reference), has been analyzed in the context of a single-electron memory cell in Katayama et al., "*Design and Analysis of High-Speed Tandem Access Memory with Coulomb Blockade Charge Confinement,*" *IEEE Trans. Electr. Dev.*, vol. 46, pp. 2210-16 (1999), incorporated herein by reference. A single-electron treatment, however, does not imply that such a phenomenology might serve for storage of a significant number of electrons, as for purposes of energy storage.

Energy storage in capacitors is free of the voltage and electrochemical energy density limitations of chemical batteries. Thus, novel techniques for overcoming leakage current due to field emission by cathodic electrons would be highly advantageous for enhancing energy storage density and self-discharge times.

SUMMARY OF EMBODIMENTS OF THE INVENTION

The present invention relates to nano-capacitors with solid or partial-vacuum dielectrics.

As used herein and in any appended further description or claims, the term "nano-capacitor" is used interchangeably with the term "nanocapacitor." The meaning of the term is that of a capacitor characterized by at least one dimension in the range between 0.1 nanometers and 1000 nanometers. It is to be understood that a capacitor is formed by one or more cathodes and one or more anodes, and that cathode and anode need not have the same shape. A dimension characterizing the capacitor may be any representative linear dimension, such as a separation between an anode and a nearest cathodic surface or region, for example only.

As used herein and in any appended claims, the term "electron mean free path" (MFP), used interchangeably with "electron inelastic mean free path" (IMFP), as applied to electrons traveling in a specified dielectric of any phase of matter, shall refer to the distance an electron may travel in the dielectric before the probability of its losing energy to scatter reaches 1/e, where e is Euler's constant. The probability of scatter is $1-e^{-d/\lambda(E)}$, where $\lambda(E)$ is the MFP of an electron at incident energy E. The electron loses energy due to such processes as electron-hole formation in the dielectric or plasmon excitation, with cross sections for those processes dependent upon the energy E of the electron. Unless otherwise specified, the MFP shall refer to electrons having a kinetic energy equal to the terminal kinetic energy they would acquire on falling through a voltage potential between two conducting surfaces across a specified dielectric spacing.

In accordance with embodiments of the present invention, a method is provided for storing energy. The method has steps of:

a. providing a plurality of non-coplanar cathodic regions and an anode spaced apart from each of the plurality of non-coplanar cathodic regions by an intervening dielectric characterized by a thickness normal to the cathodic electrode and by an electron mean free path, and b. storing an excess of electrons on the non-coplanar cathodic regions.

The thickness of the intervening solid dielectric is in the range between 0.1 nanometers and 1000 nanometers and is smaller than the electron mean free path in the intervening solid dielectric, and wherein each of the non-coplanar cathodic regions is at least 100 times larger than the thickness of the solid dielectric in every direction transverse to the thickness of the intervening solid dielectric.

In accordance with other aspects of the invention, a positive electrical potential may be maintained on the anode with respect to the plurality of non-coplanar cathodic regions. Fowler-Nordheim field emission by the plurality of non-coplanar regions may be inhibited by Coulomb blockage. In further embodiments, the anode may be filamentary.

In accordance a further aspect of the present invention, a capacitor is provided that has two or more non-coplanar cathodic regions and an anode spaced apart from each of the non-coplanar cathodic regions by an intervening dielectric characterized by a thickness normal to each of the cathodic regions and by an electron mean free path. The thickness of the intervening dielectric is in the range between 0.1 nanometers and 1000 nanometers and is smaller than the electron mean free path within the dielectric, and wherein the cathodic electrode is at least 100 times larger than the thickness of the intervening dielectric in every direction transverse to the thickness dimension of the intervening dielectric.

In accordance with an alternate embodiment of the invention, the intervening dielectric may be a solid. The anode may be filamentary, and may be disposed in a plane parallel to at least one plane containing a cathodic region of the plurality of cathodic regions.

In a further embodiment of the invention, the capacitor may have a plurality of anodes, each anode separated from one of the plurality of non-coplanar cathodes by a cell dielectric characterized by a thickness. In that case, the thickness of the cell dielectric is in the range between 0.1 nanometers and 1000 nanometers and is smaller than the electron mean free path within the cell dielectric, and wherein the cathodic electrode is at least 100 times larger than the thickness of the cell dielectric in every direction transverse to the thickness dimension of the cell dielectric.

In yet further embodiments, the intervening dielectric may have a dielectric strength exceeding 1 volt per nanometer. The solid dielectric may include a metal oxide, such as a native oxide of a metal comprising the cathodic electrode. In particular, the solid dielectric may include aluminum oxide or silicon dioxide. At least one cathodic region may be disposed within a trench substantially orthogonal to an axis of a filamentary anode. Alternatively, the plurality of cathodic regions may be disposed at substantially equal distances from a substantially point-like anode.

In accordance with further embodiments of the present invention, each nanocapacitor cell in an array of nanocapacitors may be individually addressable energy storage elements. This would allow for a controller to extract energy from any given nanocapacitor cell. In addition, random, semi-random, or specific clusters of cells could also be considered to be addressable together.

In accordance with further embodiments of the present invention, there may be layers of arrays of nanocapacitor cells that are stacked on top of each other with or without a small gap—between 0.1 nm and 1000 nm—between the layers. This gap between the stacked layers of arrays of nanocapacitors may be used for localized cooling.

In this and other regards, advantages may be obtained by use of synthetic atoms as described in Hubler, "*Synthetic atoms: Large energy density and a record power density*," Complexity, vol. 22, DOI: 10.1002/cplx.21440 (2013). This reference is incorporated herein by reference.

In accordance with another aspect of the invention, a capacitor is provided that has a cathode electrode shaped similar to a sphere. The cathode may be graphene. The capacitor also has an anodic electrode spaced apart from the cathodic electrodes by either an intervening solid dielectric characterized by a thickness dimension normal to the cathodic electrode, or with the absence of a dielectric. The anode acts as a point source to a degree possible. The anode may be a tip of a conductor. The thickness dimension of the intervening solid dielectric or vacuum gap has a thickness in the range between 0.1 nanometers and 1000 nanometers. The anode may be inside the sphere-like cathode. The anode tip may be in the center of the sphere, and may be a carbon nanotube. The distance between the cathode and the anode may be smaller than 10 times the mean-free path of particles in the vicinity if in vacuum.

BRIEF DESCRIPTION OF THE DRAWINGS

Advantages of the present invention and its several improvements will be seen when the following detailed description is read in conjunction with the accompanying drawings, in which.

DETAILED DESCRIPTION OF EMBODIMENTS OF THE INVENTION

Figure 1:
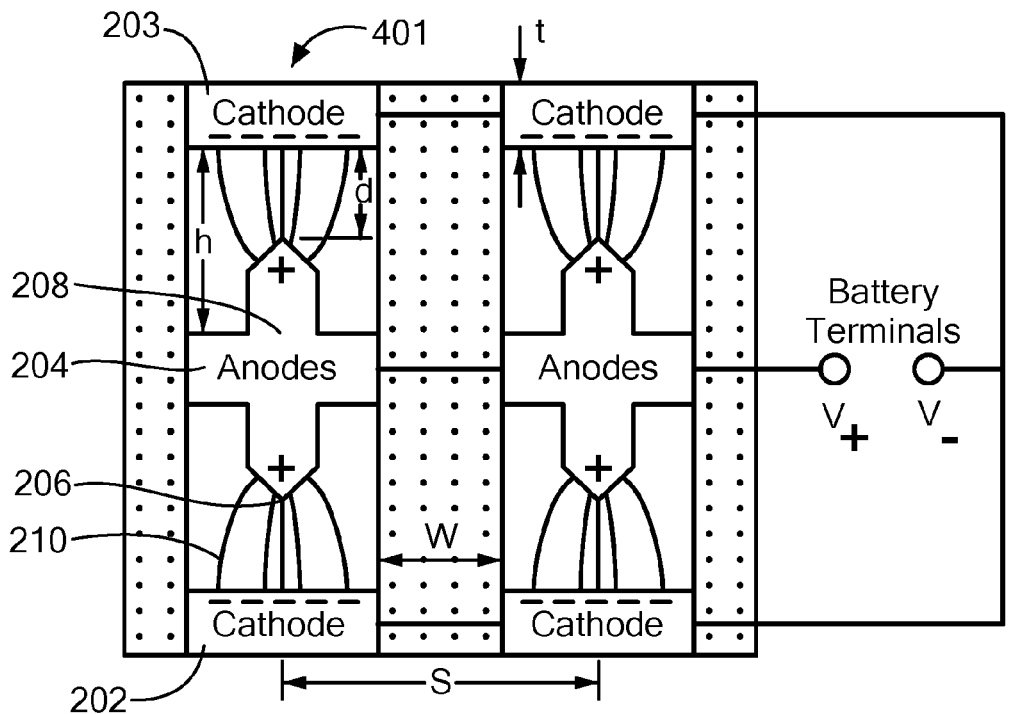
FIG. 1 shows an array of four nano vacuum tubes for energy storage in accordance with an embodiment of the present invention.

Advantages of the present invention and its several improvements will be seen when the following detailed description is read in conjunction with the drawings herein and in the appended teachings.

Techniques for fabricating dense arrays of diodic structures are described, for example, by Eden et al., *Microplasma Devices Fabricated in Silicon, Ceramic, and Metal/Polymer Structures: Arrays, Emitters and Photodetectors, J. Phys. D*, vol. 36, pp. 2869-77 (2003), which is incorporated herein by reference.

Spindt tips are described in Spindt et al., *Physical properties of thin film field emission cathodes with molybdenum cones, J. Appl. Phys.*, vol. 47, pp. 5248-63 (1976).

Single-atom apex Mueller emitters are described in Ward et al., *Helium ion microscope: A new tool for nanoscale microscopy and metrology, J. Vac. Sc. Technol. B*, v. 24, pp. 2871-74, (2006). Both of the foregoing papers are incorporated herein by reference.

The following documents are incorporated herein by reference:

Hübler, *Digital Batteries*, Complexity, vol. 14(3), pp. 7-9 (Dec. 15, 2008);

Hübler & Osuagwu, *Digital quantum batteries: energy and information storage in nano vacuum tube arrays*, Sep. 22, 2009;

Hübler & Osuagwu, *Digital quantum batteries: Energy and information storage in nano vacuum tube arrays*, Complexity, vol. 15(5), pp. 48-55), (2010).

Hübler & Lyon, *Energy Storage in Cylindrical Vacuum Carbon Nanotube Capacitor Arrays*, Apr. 2, 2010;

Belkin, Lyon, Bezryadin & Hübler, *Nanotube Vacuum Capacitors: A Verification of Field Enhancement Scaling*, Jul. 15, 2010; and Lyon, Soni, Koepke, Lyding and Hübler, *Scaling of the Fowler-Nordheim Field Enhancement Factor*, Sep. 15, 2010;

Hubler, *Synthetic atoms: Large energy density and a record power density, Complexity*, vol. 22, DOI: 10.1002/cplx.21440 (2013).

In molecules and atoms, such as the hydrogen atom, and in solids, such as metallic Li, electric fields can be much larger than typically limited by dielectric breakdown because quantization phenomena suppress charge recombination. Consequently, the electrostatic energy density can be much higher than in conventional capacitors. For example, the electric field at the surface of a hydrogen nucleus is about $10^{11}$ V/nm, and when a hydrogen molecule is dissociated and ionized in water, two hydrated hydronium ions are created and the local increase in energy density is $(2 \times 13.6 \text{ eV} + 4.52 \text{ eV})/4 \times 10^{-28} \text{ m}^3 = 29 \text{ GJ/m}^3$ (29 MJ/kg). Therefore, devices which use electrochemical reactions and other faradic processes can store more energy than conventional capacitors. Commercial electrochemical capacitors can reach an energy density of up to 18 kJ/kg, pseudo capacitors reach up to 108 kJ/kg and, in chemical batteries, the energy density can be as large as 540 kJ/kg. FIGS. 1A and 1B depict energy and power density regimes of various energy storage modalities. However, faradic processes have small charge-discharge rates because they depend on the diffusion of ions in the electrolyte ($<10^5$ W/kg for electrochemical capacitors, $<10^3$ W/kg for batteries) and on chemical reaction rates. Furthermore, the number of charge/discharge cycles of electro-chemical capacitors and batteries is small. Instabilities in the electro-crystallization lead to metal dendrites, that can cause short circuits, and irreversible chemical reactions can create films of solid material on the electrodes.

Nano vacuum tube arrays with nano-tip electrodes and flat electrodes conduct current only if the tip is charged negatively (forward direction) and if the electric field at the tip exceeds a threshold. If the electric field is reversed there is no current. Only at a much higher electric field, current will start to flow in reverse direction. Therefore nano vacuum tubes can be used as diodes and triodes and, in a reverse direction, they can be used for energy storage like a varactor diode or a capacitor. Nano plasma tubes are generally forward-biased and if the residual gas emits visible light, they can be used for flat-panel plasma lamps and flat panel monitors. Their switching speed in the THz range, which is a factor of 1000 larger than the fastest semiconductor junctions. One of the original two device types, the "Spindt array," used silicon integrated-circuit fabrication techniques to make regular arrays in which molybdenum cones were deposited in small cylindrical voids in an oxide film, with the void covered by a counter electrode with a central circular aperture. The energy density in reverse-biased nano plasma tubes is small, because gas becomes a partially ionized, conducting plasma at comparatively small electric fields.

Energy storage is now described as embodied in arrays of reverse-biased nano vacuum tubes, which are similar in design to nano plasma tubes, but which contain little or no gas. The key design parameter is the gap size, the distance between the electrodes. Electrical breakdown in vacuum gaps has been studied for more than 80 years for gap sizes above 200 nm. However, little is known about vacuum gaps in the nanometer range. It is shows herein that in reverse bias the electric field near nano-tip anodes can be larger, by orders of magnitude, than breakdown field in conventional capacitors, varactor diodes, and nano plasma tubes.

Since there are only residual gases between the electrodes in vacuum junctions, there is no Zener breakdown, no avalanche breakdown, and no material that could be ionized. Electrical breakdown is triggered by quantum mechanical tunneling of electrode material: electron field emission on the cathode and ion field emission on the anode. Because the energy barrier for electron field emission is large and the barrier for ion field emission even larger, the average energy density in reversed-biased nano vacuum tubes can exceed the energy density in solid state tunnel junctions and electrolytic capacitors. Since the inductance of the tubes is very small, the charge-discharge rates exceed batteries and conventional capacitors by orders of magnitude. Charging and discharging involve no faradaic reactions so the lifetime of nano vacuum tubes is virtually unlimited. The volumetric energy density is independent of the materials used as long as they can sustain the mechanical load, the electrodes are good conductors, and the mechanical supports are good insulators. Therefore, nano vacuum tubes can be built from environmentally friendly, non-noxious materials. Materials with a low density are preferable, since the gravimetric density is the ratio between the volumetric energy density and the average density of the electrodes and supports. Leakage currents are small, since the residual gases contain very few charged particles. Nano vacuum tubes can be fabricated with standard photo lithographic techniques, as described, for example, by Hwang et al., *Fabrication of vacuum tube arrays with a sub-micron dimension using anodic aluminum oxide nano-templates, Microelectronic Engineering*, vol. 77, pp. 2-7 (2005), which is incorporated herein by reference, and could be easily integrated in integrated circuits as a rechargeable battery.

Nano vacuum tubes with planar cathodes are now described. The anodes may be sharply pointed tips, such as Spindt tips, first described by Spindt et al., *Physical properties of thin film field emission cathodes with molybdenum cones, J. Appl. Phys.*, vol. 47, pp. 5248-63 (1976), which is incorporated herein by reference. Alternatively, the anodes may be the endings of cantilever nanotubes, as described by Ke et al., *Experiments and modeling of carbon nanotube-based NEWS devices, J. Mechanics and Physics of Solids*, vol. 53, pp. 1314-33 (2005), incorporated herein by reference.

FIG. 1 depicts four nano vacuum tubes 200. Cathodic regions 202 and 203 are designated by a '−' symbol, while the anodes 204, nano tips 206 on a flat electrode 208, are designated by a '+' symbol. Cathodic regions 202 and 203 may be regions of the same cathode 401, as in the case of the cylindrical geometry depicted in FIG. 3. However, cathodic regions 202 may be regions of distinct cathodes, as well. The nano tips 206 are arranged in a square grid at distance s. The gap size d is the shortest distance between the surface of the tip 206 and the surface of the cathodic regions 202 and 203. The height of the tube h is roughly equal to the apex radius of the tip r plus the gap size d, i.e., h≈r+d, and the distance between the tips is equal to the gap size plus the width of the insulating mechanical supports w, i.e., s≈d+w. The thickness of the planar electrodes is t. The cathode 401 is a conducting solid with high tensile strength, such as steel. The nano tip 206 is a conducting solid with extremely high tensile strength, such as a carbon nanotube clamped to the steel electrode, or a tungsten Spindt tip. The insulating walls 208, designated in FIG. 1 by dots, are solids with high compressive strength, such as silicon oxides. Thin curved lines 210 in FIG. 1 indicate electric field lines. The electrodes and the walls create a vacuum tube. The smallest tips are single-atom-apex Mueller emitters with apex radius r≈0.1 nm, about twice the crystallographic size of a single atom. Techniques for preparing Mueller emitters have been under investigation for many years. Recently an automatic technique has been developed for restoring a single-atom apex to its original state, if the top atom moves away from this position, as is described by Ward et al., *Helium ion microscope: A new tool for nanoscale microscopy and metrology*, J. Vac. Sci. Technol., vol. 24, pp. 2871-74 (2006), which is incorporated herein by reference.

Coulomb blockade limits Fowler-Nordheim field emission, to an extent that may be calculated, considering the configuration of an anode between two cathodic regions as a potential well with a bilinear potential. Calculations indicate that the distance between the first two energy levels, for a field of 1 V/nm at a displacement of r=1 nm exceeds thermal energies per mode at room temperature by more than two orders of magnitude, such that quantization and Coulomb blockade can be expected to occur at room temperature.

The suppression of leakage current due to Coulomb blockade is expected to occur for various configurations in which a cathode almost completely surrounds an anode. Some configurations of that sort are now described by way of example, and without limitation.

Figure 3A:
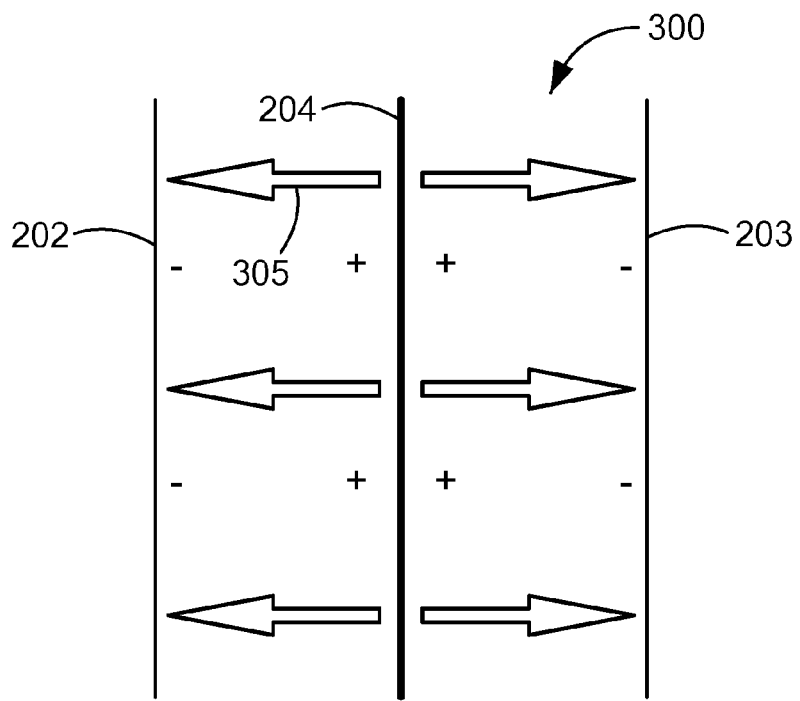
FIG. 3A is a schematic cross sectional view of a capacitor with two parallel cathodic regions and an intervening parallel anode, in accordance with an embodiment of the present invention.
Figure 3B:
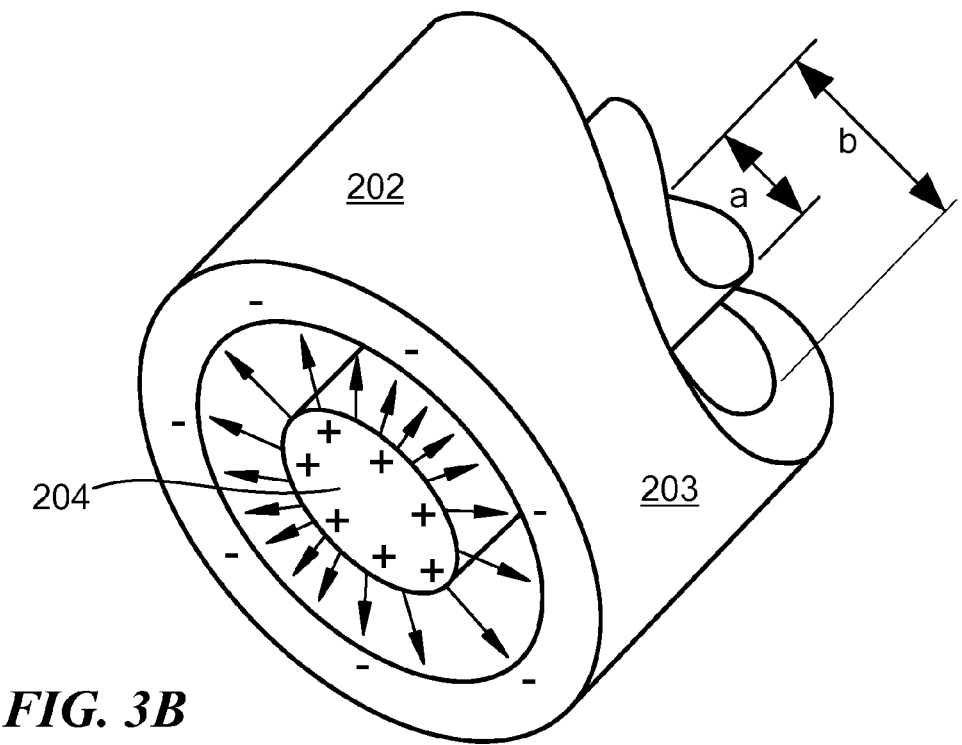
FIG. 3B is a schematic perspective view of a capacitor with two cathodic regions on a cylindrical surface surrounding an anode, in accordance with an embodiment of the present invention.
Figure 3C:
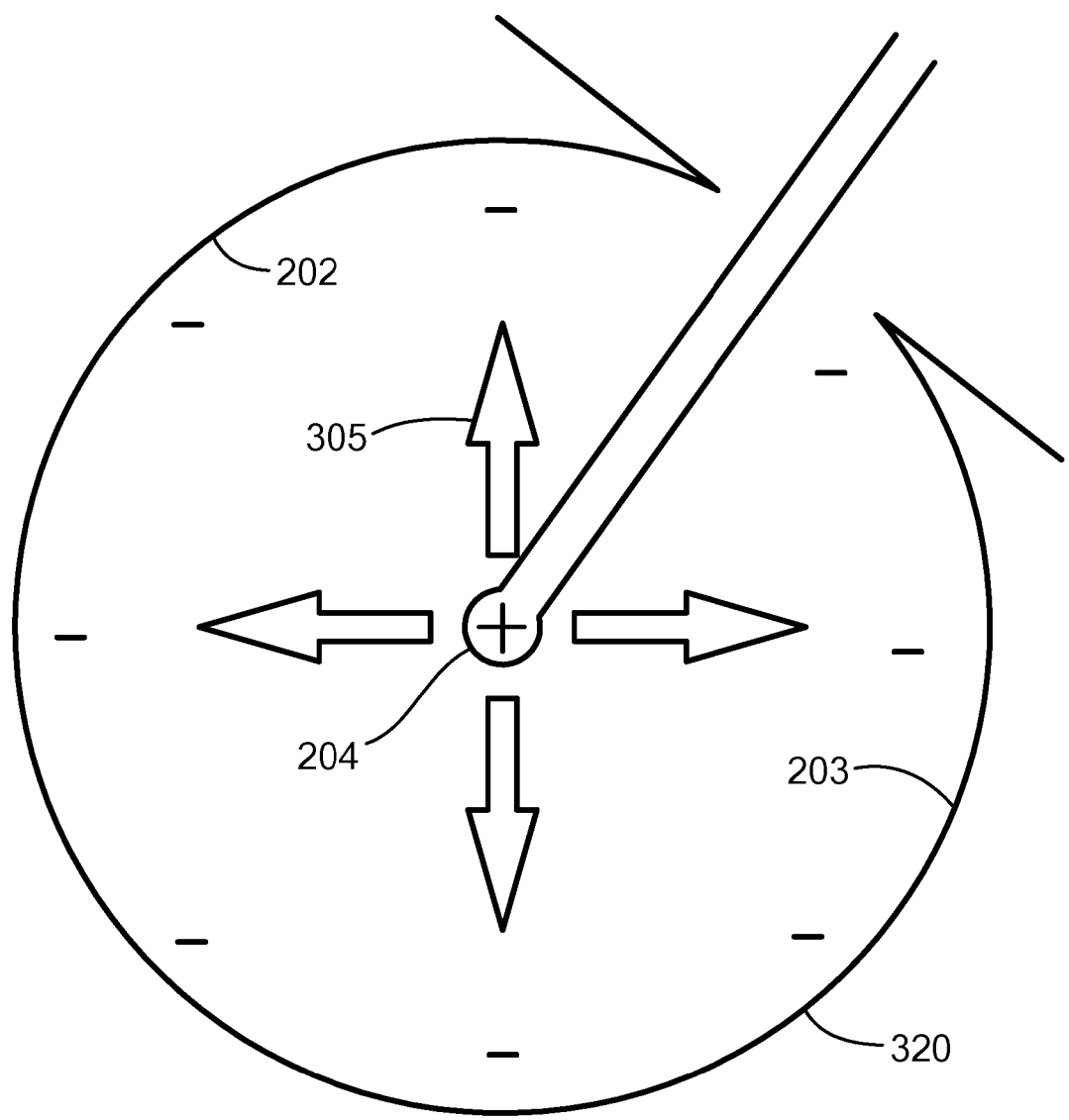
FIG. 3C is a schematic cross section of a capacitor with a central anode and a substantially spherical cathode, with representative cathodic regions shown on a spherical surface surrounding the anode, in accordance with an embodiment of the present invention.

FIG. 3A shows an embodiment of the present invention is a schematic cross sectional view of a capacitor 300 with two parallel cathodic regions 202 and 203, and an intervening parallel anode 204, in accordance with an embodiment of the present invention. Arrows 305 depict electric field lines. FIG. 3B shows an embodiment of the present invention in which cathodic regions 202 and 203 are portions of a cylindrical structure surrounding an anode 204, which may, in some embodiments, be cylindrical. FIG. 3C shows a cross sectional view of a substantially spherical cathodic electrode 320, subsections of which may be referred to as cathodic regions 202 and 203. Cathodic electrode 320 is not limited to a spherical shape, and may also form an elliptical cavity containing anode 204, within the scope of the present invention. Electric field lines 305 indicate the direction of the electric field vector in the spherical case.

Figure 4:
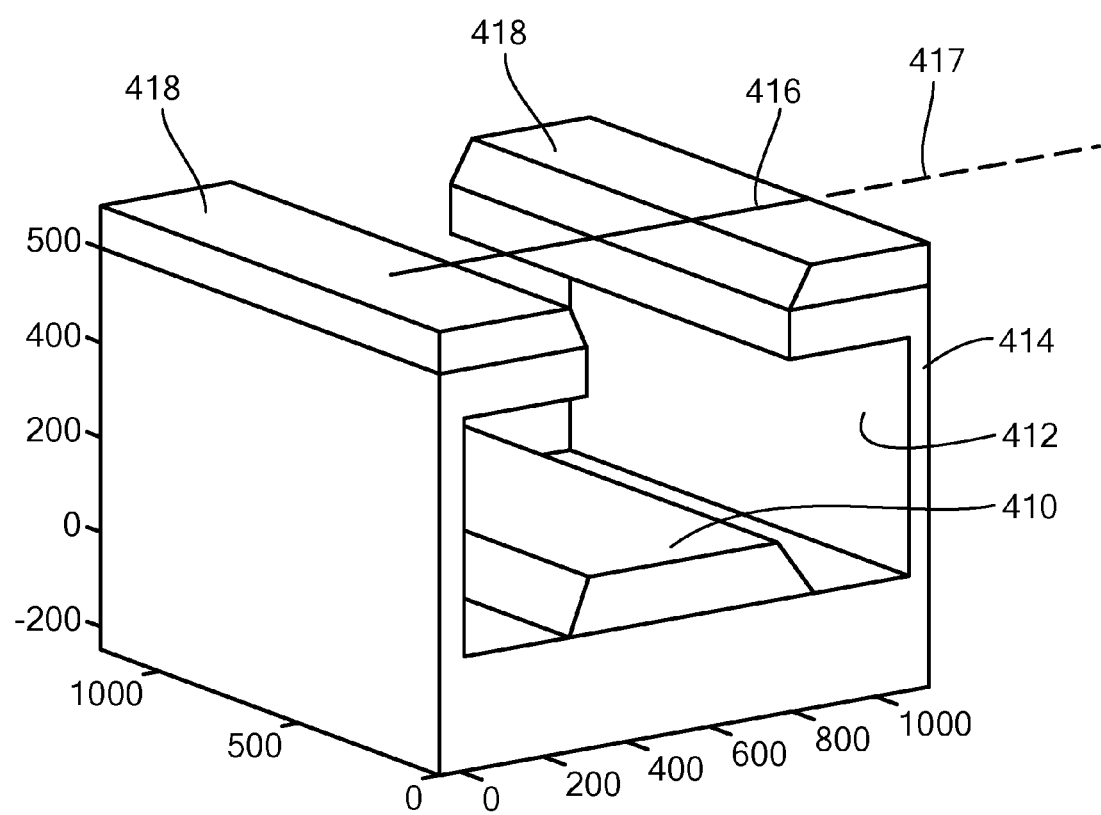
FIG. 4 is a schematic perspective view of a capacitor with a filamentary anode disposed above a micro-etched trench, in accordance with an embodiment of the present invention.

In the embodiment shown in FIG. 4, cathodic region 410 is a flat conductive electrode above which a trench 412 is etched in a silicon-oxide structure 414. A carbon nanotube 416 spanning conductive electrodes 418 serves as a filamentary anode aligned with an axis 417 substantially perpendicular to the direction of trench 412. Free-standing nano-wires, with an apex radius of r≈5 nm, clamped in normal direction to a planar metal anode may also comprise a capacitor anode in accordance with embodiments of the present invention. Pre-breakdown heating of the anode and the anode current will generally be small because the electrons penetrate several layers of the anode material and spread the heat over a large volume.

The energy density of nano vacuum tubes is limited by vacuum breakdown. At gas pressures of less than $10^{-6}$ Torr, the breakdown field does not depend on the residual gas, but on the properties of the electrode surfaces.

Figure 2:
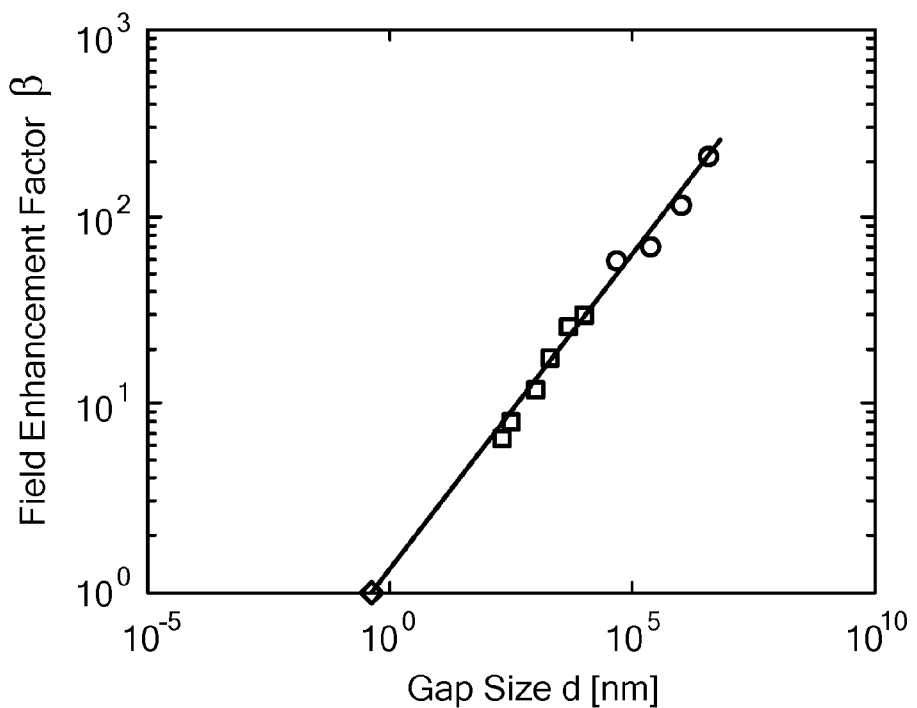
FIG. 2 shows a plot of field enhancement factor versus gap size.

The local cathode fields, enhanced by a factor β by microprotrusions and other surface defects, determines the breakdown field $E_b=\beta E_s$, where $E_s$ is the macroscopic field on the cathode surface when an arc develops. FIG. 3 shows the relation between the field enhancement factor β and the gap size d. The function $$\beta = \left(\frac{d}{0.4 \text{ nm}}\right)^{1/3}$$

approximates the relation between β and the gap size d for tungsten electrodes for d>1 nm. The field enhancement factor of copper electrodes, niobium electrodes, or niobium electrodes with a layer of gold has a similar dependence on the gap size. However β is larger for thinner and taller cathodes, and β tends to get smaller if the electrodes are thermally treated or allowed to break down many times. Only tubes with wide and short cathodes are considered in the analysis described herein. The limiting value for beta is equal to one for gap sizes of the size of one atom, as depicted in FIG. 2, where the field enhancement factor is plotted versus gap size. In FIG. 2, circles and squares indicate experimental values.

The largest component of cathode current is Fowler-Nordheim field emission, a quantum mechanical phenomenon describing the tunneling of electrons through the energy barrier at a charged metal-vacuum interface. The current density J depends on the electric field E at the surface, $$J = J_0\left(\frac{E^2}{E_0^2}\right)e^{E_0/E},$$

where $E_0 = f\Phi^{3/2}$ and $\Phi$ is the work function of the metal. $J_0$ and $f$ are material constants.

For niobium, the work function is 4 eV, and $J_0=1.15\times10^{15}$ A/m²=1.15 kA/μm² and $E_0$=54.6 V/nm. Breakdown occurs roughly at about twice the onset of field emission, i.e. $E_0 \approx E_b$. The breakdown field has a very small temperature dependence, i.e., the breakdown field is almost same at room temperature as at 100° C. Clean cathodes of tungsten, copper, niobium, or niobium with a layer of gold have a breakdown field of about $E_b$=60 V/nm. The maximum energy density near the cathode, $$u_c = \frac{\epsilon_0}{2}E_s^2$$

depends on the gap size d as:

$$u_c = \frac{\epsilon_0}{2}\frac{E_s^2}{\beta^2} = \epsilon_0 E_b^2\left(\frac{0.4 \text{ nm}}{d}\right)^{2/3},$$

where $\epsilon_0=8.85\times10^{-12}$ is the vacuum permittivity.

Coulomb blockade limits Fowler-Nordheim field emission, to an extent that may be calculated, considering the configuration of an anode between two cathodic regions as a potential well with a bilinear potential. Calculations indicate that the distance between the first two energy levels, for a field of 1V/nm at a displacement of r=1 nm exceeds thermal energies per mode at room temperature by more than two orders of magnitude, such that quantization and Coulomb blockade can be expected to occur at room temperature.

Figure 5A:
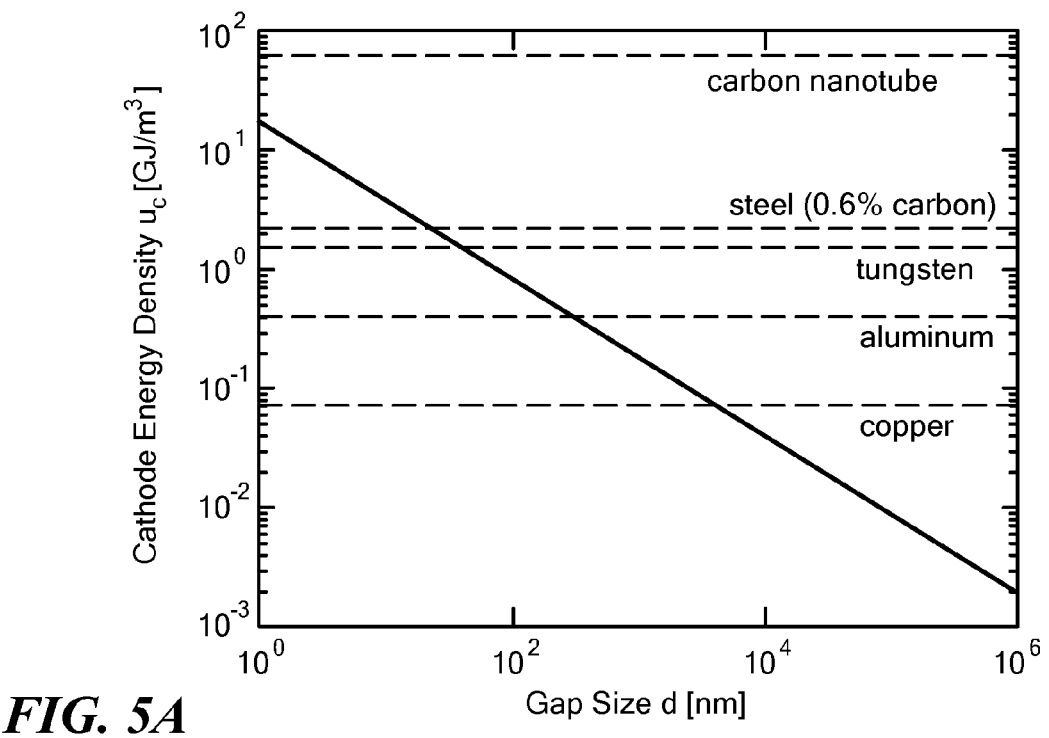
FIGS. 5A and 5B show regimes of operation, in accordance with embodiments of the present invention, in the plane of gap size vs. cathode energy density.
Figure 5B:
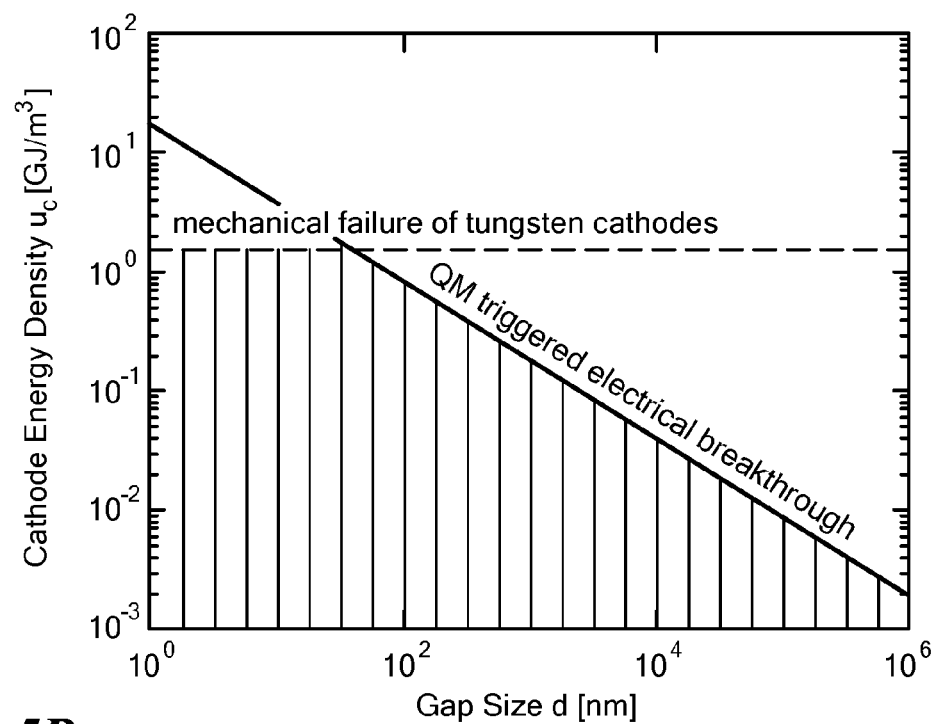

FIGS. 5A and 5B show the maximum energy density near the cathode as a function of gap size. The continuous line illustrates the energy density at the cathode at breakdown vs.

the gap size. As apparent from the diagonal line plotted in FIGS. 5A and 5B, the maximum energy density is larger for smaller gap sizes. For example, in a tube with gap size d=25 nm the maximum energy density at the cathode is a factor of 100 larger than in a tube with gap size d=25 μm. The electric field creates a force on the surface of the cathode. The pressure $p_c$ on the cathode surface due to electric fields equals the energy density at the surface, i.e. $p_c=u_c$. The cathode disintegrates if $u_c$ exceeds the tensile strength $P_t$ of the cathode material. Therefore, the tensile strength of the cathode material limits the energy density near the cathode $u_c$ too. The dashed lines in FIG. 5A indicate the tensile strengths of various cathode materials. The shaded area in FIG. 5B indicates where the energy storage is stable in a tube with a tungsten cathode. If the voltage on a tube with gap size d=10 nm is increased, the energy density at the cathode increases, until it reaches $u_c$=1.51 GJ/m$^3$. The pressure on the electrode then exceeds the tensile strength of tungsten and the electrode disintegrates. However, if a vacuum junction with gap size d=10 μm is charged, field emission will trigger electrical breakdown at an energy density which is much below the tensile strength of tungsten, as shown in FIG. 5B.

The mechanical supports and the electrodes form vacuum micro-tubes. Hwang et al. have shown that is possible to fabricate nano vacuum tubes which are stable under atmospheric pressure. In the following, it is assumed that the micro-tubes are roughly cubical, and that the tips are far enough from the planar anode that the electric field E in the tube can be approximated by a point charge with its image charge at the cathode. Furthermore, any interaction between tubes is neglected. A coordinate system is introduced in which the apex centers of the tips are in the x-y plane and the origin is at the apex center of one of the tips. The electric field at a position x in the tube between the electrodes is complicated but can be roughly approximated by a point charge in front of a conducting plane, namely:

$$E(x) = E_a r^2 \left( \frac{x}{|x|^3} + \frac{x_i - x}{|x_i - x|^3} \right), \quad (3)$$

where $E_a$ is the magnitude of the electric field at the surface of the anode, and $x_i$=(0, 2d+2r, 0) is the location of the image charge.

Assuming that the largest electric field at the cathode is equal to the breakdown field, i.e., |E(0, d+r, 0)|=$E_s$, Eqs. 1 and 3 yield a relation between the electric field at the anode and the electric field at the cathode:

$$E_s = \frac{E_b}{\beta} = 2E_a \frac{r^2}{(d+r)^2}. \quad (4)$$

Therefore, the maximum energy density $u_a$ at the anode depends on the maximum energy density $u_c$ at the cathode and the sharpness of the tip, $$u_a = \frac{\epsilon_0}{2} E_a^2 = u_c \frac{(1+S)^4}{4} = \epsilon_0 E_b^2 \left( \frac{0.4 \text{ nm}}{d} \right)^{2/3} \frac{(1+S)^4}{4},$$

where the ratio $$S = \frac{d}{r}$$

is a measure or me snarpness of the tip. If the energy density at the anode is larger than this value, then field emission at the cathode triggers an electrical breakdown. A sharply tipped anode can have a very high energy density without exceeding the limiting energy density at the cathode.

Figure 6A:
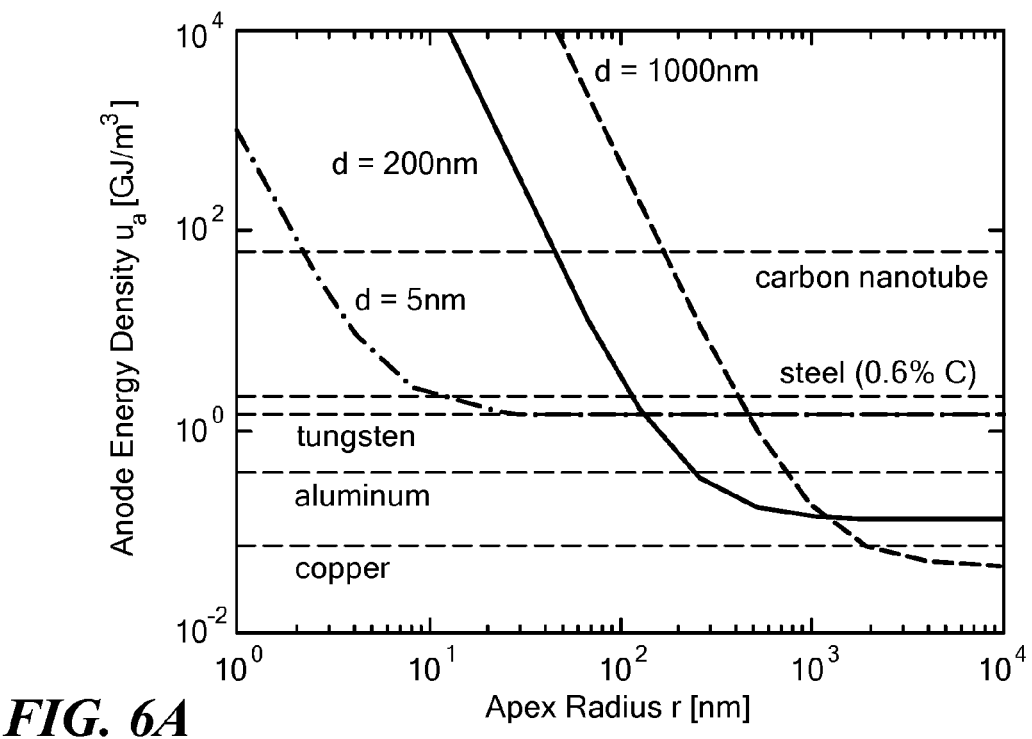
FIGS. 6A and 6B show regimes of operation, in accordance with embodiments of the present invention, in the plane of anode apex radius vs. anode energy radius.
Figure 6B:
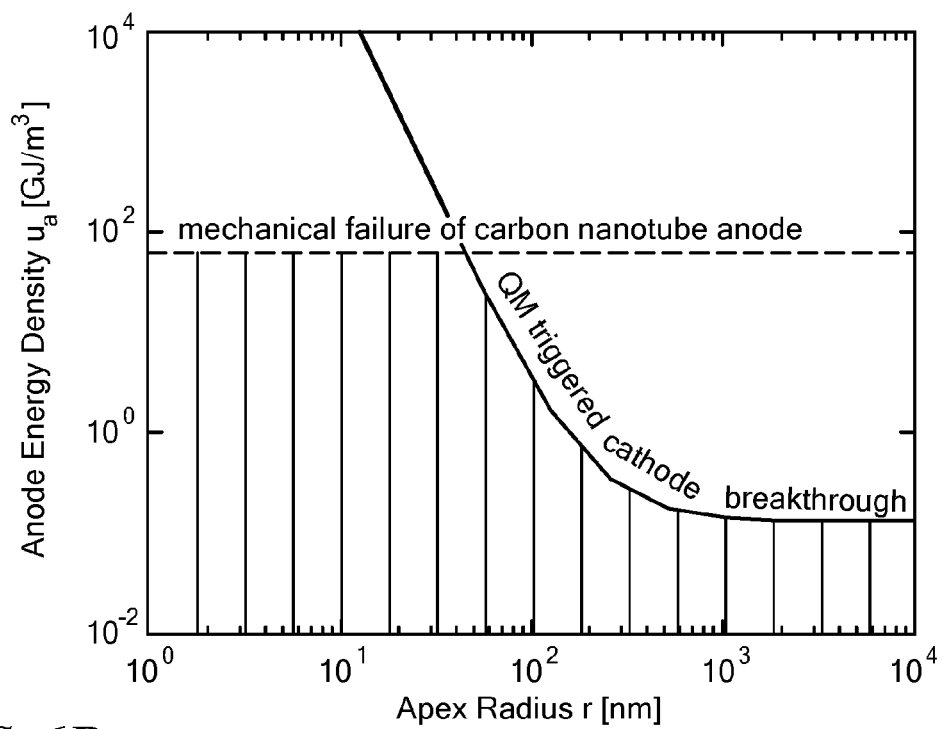

FIGS. 6A and 6B show the maximum energy density at the anode versus the sharpness of the tip for gap sizes d=5 nm, d=200 nm and d=1 μm and apex radius 1 nm<r<10 μm. FIG. 6A illustrates the tensile strength of typical anode materials. The shaded area in FIG. 6B indicates where the energy storage is stable in a tube with a carbon nanotube anode and a cathode that does not fail mechanically.

If the voltage on the tube with apex radius r=10 nm is increased, the energy density at the anode increases, until it reaches $u_a$=62 GJ/m$^3$. The pressure on the electrode then exceeds the tensile strength of carbon nanotubes and the anode disintegrates. However, if a vacuum junction with apex r=10 μm is charged, field emission on the cathode will trigger electric break down even if energy density at the anode is much below the tensile strength of carbon nanotube anode, as evident in FIG. 6B. Eqs. 1-4 imply that the average electric field at the cathode $E_s$ is limited by (i) the field enhancement factor β, which is a function of the gap size d, (ii) the work function $E_b$ of the cathode material, (iii) the tensile strength of the cathode $P_c$ and the anode $P_a$ and (iv) the sharpness of the anode S, yielding:

$$E_s = E_a \frac{2r^2}{(d+r)^2} = \min\left\{ \frac{E_b}{\beta}, \sqrt{\frac{2P_c}{\epsilon_0}}, \sqrt{\frac{2P_a}{\epsilon_0(1+S)^4}} \right\}.$$

Within the vacuum tube, the electric field is largest near the y-axis within the region $$R = \left\{ (x, y, z) \mid x^2 < \frac{d^2}{4(d+r)^2} y^2 \text{ and } z^2 < \frac{d^2}{4(d+r)^2} y^2 \right\}.$$

Therefore, the average energy density u in the tube at breakdown may be estimated from the electric field near the y-axis as:

$$u_a = \frac{\epsilon_0}{2} E_a^2 = u_c \frac{(1+S)^4}{4} = \epsilon_0 E_b^2 \left( \frac{0.4 \text{ nm}}{d} \right)^{2/3} \frac{(1+S)^4}{4},$$

where $$S = \frac{d}{r}$$

is a measure of the sharpness of the tip.

Eq. 4 implies that field emission at the cathode triggers electric breakdown if the average energy density exceeds $$u \approx \frac{\epsilon_0}{2} E_s^2 \begin{cases} 1 \text{ if } 0 \leq S \leq 2 \\ \frac{S+2}{4} \text{ if } S > 2 \end{cases}.$$

Therefore, $$u = e_t \cdot \min\left\{\frac{\epsilon_0}{2}\frac{E_b^2}{\beta^2}, P_c, \frac{P_a}{(1+S)^4}\right\},$$

where $e_t$ is the tip enhancement factor, and $e_t=1$ for $0 \leq S \leq 2$, $e_t=(S+2)/4$ for $S \geq 2$, and $e_t=S/4$ for $S \gg 2$. In small tubes, the average energy is often limited by the tensile strength of the electrodes ($P_c$ and $P_a$), and not by electric breakdown.

For instance, in a tube with a flat tungsten electrodes and gap size d=40 nm, the average energy density is limited by the tensile strength of the tungsten electrodes, as seen in FIG. 4B. The limiting value of the average energy density is $u=P_t=1.51\times10^9$ J/m$^3$, which is about a factor of $10^4$ larger than in conventional capacitors. Carbon nanotubes have a very high tensile strength of about 62 GPa (compared with a theoretical limit of about 300 GPa. Therefore, carbon nanotubes are preferred for the anode, and tungsten is preferred for the cathode. For a tube with a carbon nanotube anode (r=5 nm), a flat tungsten cathode and the same gap size (d=40 nm) the average energy density is $u=2.5P_t=3.78$ GJ/m$^3$.

The wall material, such as SiO$_2$, needs to support this load. According to Pascal's law, the minimum cross sectional area of the wall material $A_w$ is:

$$A_w = A_c \frac{u}{e_t A P_w},$$

where $P_w$ is the compressive strength of the wall material and $A_c$ is the area of the cathode. The compressive strength of SiO$_2$ is about $P_w$=109 Pa. For a tube with flat electrodes (S=0) and gap size d=40 nm and u=1.51 GJ/m$^3$, the cross sectional area of the wall has to be at least 1.51 times the area of the cathode, i.e. $A_w/d^2$=1.5. In this case, the average density of the tube is not much less than the density of the wall material.

Assuming that the electrodes are very thin, i.e., t≪d, the average density of the tube is $$\rho = \frac{A_w \rho_w + A_c \rho_g}{A_w + A_c},$$

where $\rho_g$ is the density of the residual gas in the tube. Since the density of the residual gas is very small, $\rho_g \ll \rho_w$, the density can be approximated by $$\rho = \frac{A_w \rho_w}{A_w + A_c}.$$

Then, the gravimetric energy density $u_g$ at breakdown is:

$$u_g = \frac{u}{\rho} = \frac{u}{\rho_w} + u_{g,min}$$

where $u_{g,min}$ is the minimum gravimetric energy density. If the average energy density u is small, the walls can be very thin, and therefore the gravimetric energy density is at least $u_{g,min}$. Therefore, the gravimetric energy density is in the range:

$$e_t \frac{P_w}{\rho_w} \leq u_g \leq \frac{u}{\rho_w} + e_t \frac{P_w}{\rho_w},$$

where $e_t>1$ is the tip enhancement factor. If the energy density is less than the compressive strength of the wall material, then the insulating walls can be thin, and thus the compressive strength of the walls sets a lower limit for the gravimetric energy density. For SiO$_2$ walls, the ratio $P_w$=200 kJ/kg is only a factor of two less than the maximum gravimetric density of chemical batteries. For a tube with flat tungsten electrodes and gap distance d=40 nm, the gravimetric energy density is $u_g$=600 kJ/kg. For a tube with a carbon nanotube anode (r=5 nm), a flat tungsten cathode, SiO$_2$ walls, and the same gap size d=40 nm, the gravimetric energy density is $u_g$=1.51 MJ/kg. This value is a factor of three larger than the maximum gravimetric energy density of Li-metal batteries.

The most significant drawback to nano vacuum tubes is the high voltage. The largest potential difference between the electrodes is $$\Delta V = \int_r^{r+d} E(0, y, 0) dy = E_a r^2 \frac{d}{r(d+r)}.$$

Applying Eq. 4 and Eq. 1 leads to:

$$\Delta V = E_s d \cdot e_v,$$

where $E_s$ is the electric field at the cathode, and $$e_v = \frac{(1+S)^2}{1+2S}$$

is the voltage enhancement factor. The voltage enhancement factor can be approximated by $e_v=1$ if $0 \leq S \leq 2$, and otherwise $e_v=S/2$.

For a tube with flat electrodes (S=0) with gap size d=40 nm and $E_b$=60V/nm, the potential difference between the electrodes is $\Delta V$=24V. For a tube with a carbon nanotube anode (r=5 nm), a flat tungsten cathode, SiO$_2$ walls, and gap size d=40 nm, the voltage is $\Delta V$=114V.

The volumetric capacitance $$c = \frac{2u}{\Delta V^2}$$

of nano vacuum tubes is inversely proportional to the square of the gap size:

$$c = \frac{\epsilon_0}{d^2} \frac{e_t}{e_v}.$$

Therefore, tubes with a smaller gap size have a higher capacitance. If the anode is flat (S=0), then the capacitance is $$c = \frac{\epsilon_0}{d^2}$$

and for tubes with sharply pointed anodes (S≥2), the capacitance is approximately $$c \approx \frac{\epsilon_0}{d^2} \frac{2}{S}.$$

This means that tubes with sharply pointed anodes have a smaller capacitance. Such tubes can reach higher energy densities, but require higher voltages to reach these energy densities. The gravimetric capacitance $$c_g = \frac{2u_g}{\Delta V^2}.$$

For example, a tube with flat electrodes and a gap size d=40 nm has a capacitance of $c_g$=2083 F/kg.

The charging-discharging rate of nano vacuum tubes is limited by their inductance, $$f \approx \sqrt{\frac{c_0^2}{d}} = \frac{c_o}{d},$$

where $c_0$ is the speed of light, and $A_c=d^2$ is the cathode area. Leak currents limit the charging-discharging rates too. The smallest discharging/charging rate is $$f = \frac{1}{RC},$$

where the resistance $$R = \frac{A_c}{\sigma_w d}$$

and the capacity $C=cA_c d$. Therefore, the charging/discharging rates of nano vacuum tubes are in the range $$\frac{\epsilon_0 A_c}{\sigma_w A_w} \cdot \frac{e_t}{e_v} < f < \frac{c_0}{d}.$$

For a cavity with flat electrodes, gap size d=40 nm and SiO$_2$ walls $$\left(\sigma = 10^{-11} \frac{1}{\Omega m}\right)$$

the charge-discharge rate is in the range $10^{-22}$ Hz<f<7.5 THz. The lower limit is very small. This means that the tube holds the charge for many years and thus can be discharged very slowly without any losses. The upper limit is very large (See FIGS. 1A and 1B). This means that the vacuum nano tube can be discharged very quickly and has a high power density. The maximum power density in a 40 nm tube is $2.8 \times 10^{22}$ W/m$^3$ ($1.1 \times 10^{19}$ W/kg).

As has been discussed above, vacuum breakdown triggered by field emission limits the energy density in vacuum tubes. However smaller tubes have a smaller field enhancement factor β. Therefore, the energy density in smaller tubes is larger. The energy density can be further enhanced by using a nano-tip anode. The tip enhancement factor for the energy density is $e_t=(S+2)/4$, however the voltage difference is enhanced too, by a factor $$e_v = \frac{(1+S)^2}{1+2S}.$$

Since nano vacuum tubes are empty, their average density is less than the density of the materials that constitute them. This sets a lower limit for the gravimetric energy density $u_{g,min}=e_t P_w/\rho_w$, where $P_w$ is the compressive strength of the wall material and $\rho_w$ is the density of the wall material. Nano vacuum tubes with an energy density u of more than 1 GJ/m$^3$ have to be thick-walled. $u_{g,min}$ and the enhancement factors combine to make nano vacuum tubes the devices with the highest gravimetric energy density (See FIG. 1B). $u_{g,min}$ and the enhancement factors are due to the geometry of the device, and largely independent of the material properties, except for Eq. 1, the electric field $E_b$ at breakdown, and the compressive strength of the wall material. However Eq. 1 appears to hold for a large range of electrode materials and the breakdown field is pretty similar for many metals. Therefore the device should have a very similar energy storage capacity for a large range of electrode materials. For that reason, inexpensive, environmentally friendly materials can be used to fabricate it, including glass (SiO$_2$) as a wall material. The charging-discharging rates of nano tubes exceed those of all other known devices. Vacuum nano tubes can hold electric energy without any losses for many years, and can be charged and discharged rapidly. The largest charging-discharging rate for vacuum nano tubes is proportional to the ratio between the gap size and the speed of light, whereas the charging-discharging rate of batteries and electro-chemical capacitors depends on diffusion rates and chemical reaction rates. Conventional capacitors have a large inductance, leading to a charging-discharging rate that is comparatively small. The gravimetric power density of nano vacuum tubes could even exceed that of nuclear chain reactions because the gravimetric power density of nuclear chain reactions depends on the speed of neutrons which is much less than the speed of light. Since nano vacuum tubes use no faradic processes, their life time is much longer than electrolytic capacitors and batteries.

Nano vacuum tube arrays have great potential as power sources for electronic devices because they can be produced with standard lithographic processes and can be part of integrated circuits. Integrated circuits with an internal power source have small ohmic losses compared to circuits with an external energy supply and produce less heat.

In cases where each cavity is individually addressable, such as random access memory, the tubes can be charged and discharged in any arbitrary order. If a MOSFET is inserted in the wall of the vacuum tube, the state of the tube can be determined without charging or discharging it. In this case each nano vacuum tube has two gates, an energy gate and an information gate, similar to the floating gate and control gates in flash drives. Vacuum nano tubes with both gates can be used for information and energy storage. For example to store the number '22', the number is converted to binary notation, $22=10110_2$, and then the energy gates may be used to charge the first, third and fourth tubes, leaving the second and fifth tubes uncharged. When the energy gate holds a charge, it induces an electric field in the MOSFET that partially cancels the electric field from the electrodes of the information gate, which modifies the threshold voltage of the MOSFET. During read-out, a voltage slightly above the regular threshold voltages is applied to the information gate, and the MOSFET channel will become conducting or remain insulating, depending on the voltage threshold of the MOSFET, which depends on the charge on the energy gate. The current flow through the MOSFET channel is measured and provides a binary code, reproducing the stored data.

As taught in detail above, nano-capacitors can have much higher dielectric strength than other capacitors, because dielectric strength increases with decreasing electrode spacing. In the discussion that follows in the appended text and in embedded drawings, high-resistance dielectrics such as aluminum oxide and silicon dioxide are considered and experimental results are presented.

Native aluminum oxide layers grown on thin films or sheets of aluminum has been shown to be an advantageous dielectric for nano-capacitors in that it such structures are lightweight and easily fabricated.

The embodiments of the invention described herein are intended to be merely exemplary; variations and modifications will be apparent to those skilled in the art. All such variations and modifications are intended to be within the scope of the present invention as defined in any appended claims.

I claim:

1. A method for storing energy, the method comprising:
  a. providing
    (1) a plurality of cathodic regions that do not lie entirely within the same plane; and
    (2) an anode spaced apart from each of the plurality of cathodic regions by an intervening dielectric characterized by a thickness normal to the cathodic regions and by an electron mean free path,
  wherein a thickness of the intervening dielectric is in the range between 0.1 nanometers and 1000 nanometers and is smaller than the electron mean free path within the dielectric, and wherein each cathodic electrode is at least 100 times larger than the thickness of the intervening dielectric in every direction transverse to the thickness dimension of the intervening dielectric; and
  b. storing an excess of electrons on the cathodic regions.

2. A method in accordance with claim 1, further comprising maintaining a positive electrical potential on the anode with respect to the plurality of cathodic regions.

3. A method in accordance with claim 1, wherein Fowler-Nordheim field emission by the plurality of cathodic regions is inhibited by Coulomb blockage.

4. A method in accordance with claim 1, wherein the anode is filamentary.

5. A capacitor comprising:
  a. a plurality of cathodic regions that do not lie entirely within the same plane;
  b. an anode spaced apart from each of the cathodic regions by an intervening dielectric characterized by a thickness normal to each of the cathodic regions and by an electron mean free path,
  wherein the thickness of the intervening dielectric is in the range between 0.1 nanometers and 1000 nanometers and is smaller than the electron mean free path within the dielectric, and wherein each cathodic region is at least 100 times larger than the thickness of the intervening dielectric in every direction transverse to the thickness dimension of the intervening dielectric.

6. A capacitor in accordance with claim 5, wherein the intervening dielectric is a solid.

7. A capacitor in accordance with claim 5, wherein the anode is filamentary.

8. A capacitor in accordance with claim 7, wherein the anode is disposed in a plane parallel to at least one plane containing a cathodic region of the plurality of cathodic regions.

9. A capacitor in accordance with claim 5, comprising a plurality of anodes, each anode separated from one of the plurality of cathodic regions by a cell dielectric characterized by a thickness,
  wherein the thickness of the cell dielectric is in the range between 0.1 nanometers and 1000 nanometers and is smaller than the electron mean free path within the cell dielectric, and wherein each cathodic region is at least 100 times larger than the thickness of the cell dielectric in every direction transverse to the thickness dimension of the cell dielectric.

10. A capacitor in accordance with claim 5, wherein the intervening dielectric has a dielectric strength exceeding 1 volt per nanometer.

11. A capacitor in accordance with claim 6, wherein the solid dielectric includes a metal oxide.

12. A capacitor in accordance with claim 11, wherein the solid dielectric includes a native oxide of a metal comprising at least one of the cathodic regions.

13. A capacitor in accordance with claim 6, wherein the solid dielectric includes aluminum oxide.

14. A capacitor in accordance with claim 6, wherein the solid dielectric includes silicon dioxide.

15. A capacitor in accordance with claim 4, wherein at least one cathodic region is disposed within a trench substantially orthogonal to an axis of a filamentary anode.

16. The capacitor in accordance with claim 3, wherein the plurality of cathodic regions are disposed at substantially equal distances from a substantially point-like anode.

* * * * *